(12) United States Patent
Xiong et al.

(10) Patent No.: US 9,716,919 B2
(45) Date of Patent: Jul. 25, 2017

(54) QUEUE TO DISPLAY ADDITIONAL INFORMATION FOR ENTITIES IN CAPTIONS

(71) Applicant: Hulu, LLC, Santa Monica, CA (US)

(72) Inventors: Tao Xiong, Beijing (CN); Zhibing Wang, Beijing (CN); Guoxin Zhang, Beijing (CN); Chenguang Zhang, Beijing (CN); Heng Su, Beijing (CN)

(73) Assignee: HULU, LLC, Santa Monica, CA (US)

( * ) Notice: Subject to any disclaimer, the term of this patent is extended or adjusted under 35 U.S.C. 154(b) by 393 days.

(21) Appl. No.: 14/080,666

(22) Filed: Nov. 14, 2013

(65) Prior Publication Data
US 2015/0095938 A1   Apr. 2, 2015

Related U.S. Application Data

(63) Continuation of application No. PCT/CN2013/084689, filed on Sep. 30, 2013.

(51) Int. Cl.
*H04N 21/81* (2011.01)
*H04N 21/433* (2011.01)
*H04N 21/462* (2011.01)
*H04N 21/4722* (2011.01)

(52) U.S. Cl.
CPC ..... *H04N 21/8133* (2013.01); *H04N 21/4331* (2013.01); *H04N 21/4622* (2013.01); *H04N 21/4722* (2013.01)

(58) Field of Classification Search
CPC ......... H04N 21/25891; H04N 21/8133; H04N 21/4331; H04N 21/4622; H04N 21/4722
USPC .......................................................... 725/13
See application file for complete search history.

(56) References Cited

U.S. PATENT DOCUMENTS

| | | | |
|---|---|---|---|
| 7,444,659 B2* | 10/2008 | Lemmons | H04N 7/17318 375/E7.006 |
| 2006/0015893 A1* | 1/2006 | Kitsukawa | G06Q 20/387 725/23 |
| 2013/0268523 A1* | 10/2013 | Andler | G06Q 50/01 707/723 |
| 2014/0157296 A1* | 6/2014 | Amidei | H04N 7/17318 725/13 |
| 2015/0063782 A1* | 3/2015 | Yamashita | H04N 5/445 386/243 |

\* cited by examiner

*Primary Examiner* — Sumaiya A Chowdhury
(74) *Attorney, Agent, or Firm* — Fountainhead Law Group P.C.

(57) ABSTRACT

In one embodiment, a method receives a video for a media program and a set of captions for a dialog in the video. A media player plays the video. A time associated with playing of the video is determined and then the method determines a set of entities in relation to the time. The set of entities are included in one or more captions in the set of captions. The method displays the set of entities in a queue where the set of entities are associated with additional information for each respective entity in the set of entities.

21 Claims, 10 Drawing Sheets

FIG. 9 ation No. PCT/CN2013/084689 filed Sep. 30, 2013, which
QUEUE TO DISPLAY ADDITIONAL INFORMATION FOR ENTITIES IN CAPTIONS

CROSS-REFERENCE TO RELATED APPLICATIONS

This application is a continuation of International Application No. PCT/CN2013/084689 filed Sep. 30, 2013, which is incorporated by reference in its entirety for all purposes.

BACKGROUND

While watching a video, a user may want to know more information about an entity in the video. For example, the user may see a character in the video and want to know the real name of the person who is playing that character. Also, the user may want to know additional information about the character or person, such as other shows or movies the person is in.

A video may be configured with interactive features that allow a user to select entities in the video. For example, a user may maneuver a pointer over the face of one of the characters in the video and be shown more information about the character. To enable the interactivity, a company must process the video to determine relevant entities in the video. For example, the company may use face detection to detect and track faces in the video, which requires analysis of pixels of the video. Then, the characters must be identified by visual inspection. This process is time-consuming and also requires human inspection.

SUMMARY

In one embodiment, a method receives a video for a media program and a set of captions for a dialog in the video. A media player plays the video. A time associated with playing of the video is determined and then the method determines a set of entities in relation to the time. The set of entities are included in one or more captions in the set of captions. The method displays the set of entities in a queue where the set of entities are associated with additional information for each respective entity in the set of entities.

In one embodiment, a method includes: receiving, by a computing device, captions for a video of a media program; analyzing, by the computing device, the captions to determine entities in the captions; determining, by the computing device, additional information for respective entities in the captions; associating, by the computing device, respective additional information with occurrences of the respective entities in the captions; and storing, by the computing device, the additional information and the entities, wherein entities are useable to display a set of entities in a queue in a coordination with a time when the video is being played by a user device.

In one embodiment, a non-transitory computer-readable storage medium contains instructions, that when executed, control a computer system to be configured for: receiving a video for a media program; receiving a set of captions for a dialog in the video; playing the video in a media player; determining a time associated with playing of the video; determining a set of entities in relation to the time, the set of entities being included in one or more captions in the set of captions; and displaying the set of entities in a queue, wherein the set of entities are associated with additional information for each respective entity in the set of entities.

In one embodiment, an apparatus includes: one or more computer processors; and a non-transitory computer-readable storage medium comprising instructions, that when executed, control the one or more computer processors to be configured for: receiving captions for a video of a media program; analyzing the captions to determine entities in the captions; determining additional information for respective entities in the captions; associating respective additional information with occurrences of the respective entities in the captions; and storing the additional information and the entities, wherein entities are useable to display a set of entities in a queue in a coordination with a time when the video is being played by a user device.

The following detailed description and accompanying drawings provide a better understanding of the nature and advantages of particular embodiments.

DETAILED DESCRIPTION

Described herein are techniques for a caption processing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
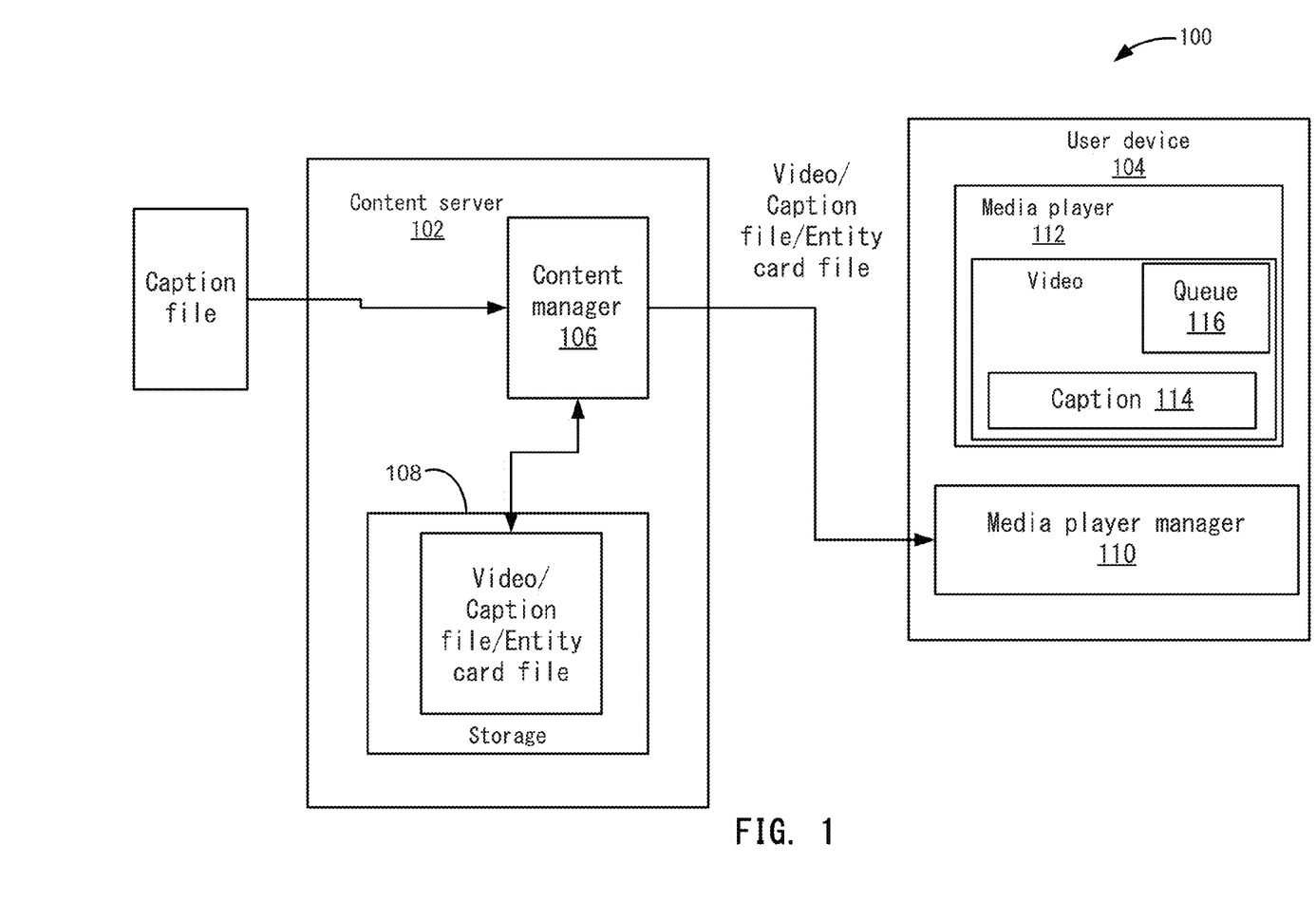
FIG. 1 depicts a simplified system for providing interactive captions and a queue of entities from the captions according to one embodiment.

FIG. 1 depicts a simplified system 100 for providing interactive captions and a queue of entities from the captions according to one embodiment. System 100 includes a content server 102 and a user device 104. Content server 102 may send videos to user device 104 through a network. In one embodiment, content server 102 is associated with a media program provider, which provides a service in which users can access a library of videos (or other media) through a service. Although one content server 102 and one user device 104 are shown, it will be understood that multiple instances of each may be used. Also, a system to deliver videos to user devices 104 will be described in more detail below.

A content manager 106 receives a caption file and processes captions in the caption file to identify entities in the captions. Although the caption processing is described as being in the same server that serves content, it will be understood that different devices may perform caption processing and content serving. The caption file may include captions for a spoken dialogue in the video. Although a spoken dialogue is described, some captions may describe information that is not spoken, such as sounds or events that are occurring in the video. The captions may include a variety of entities. For example, the entities may include a character's name, event names, organization names, locations, landmarks, inanimate objects (e.g., purses, hats, clothes, etc.), etc.

Content manager 106 may recognize the entities name using a caption recognition algorithm that analyzes text of the captions. For example, a natural language recognition algorithm may perform term searches and/or analyze context between terms in the captions. The processing of the text of the captions may be less computationally intensive than processing video. For example, analyzing text is less computationally intensive than analyzing pixels of video. This provides an efficient way to determine entities in a video. Further, the captions include context in that a name of the entity or semantics of the text can be used.

After analyzing the captions, content manager 106 may then generate entity cards for entities content manager 106 recognized in the captions. An entity card may include additional information that is associated with the entity. For example, the additional information may be a character's name in the video, the real name of a person playing the character, a brand of an object, additional information on a location, or any other information that can be determined for the entity. Each entity card may be associated with an entity in the captions in the caption file for each occurrence of the entity. For example, if a character's name is mentioned at the one-minute, five-minute, and ten-minute marks of the video, an entity card for that character is linked with the entity at the one-minute, five-minute, and ten-minute marks. Once content manager 106 processes the captions, content manager 106 stores the video, the caption file, and the entity card file in storage 108, which may be a separate device from content manager 106 or included within content manager 106.

When a user requests the video, content manager 106 may send the video, caption file, and entity card file to user device 104. It will be understood that content manager 106 may use different techniques in sending the video, caption file, and entity card file to user device 104. For example, only portions of the video, caption file, and entity card file may be sent. As will be described below, content server 102 may use a streaming protocol to stream the video to user device 104. Also, in one embodiment, content server 102 may send the entire caption file and entire entity card file to user device 104 upon, before, or after starting streaming of the video. For example, before starting the send the video, content manager 106 sends the entire caption file and entire entity card file to user device 104. In other embodiments, content server 102 may send portions of the caption file and entity card file with portions of video to user device 104.

User device 104 includes a media player manager 110 and a media player 112. Media player manager 110 receives the video, caption file, and entity card file, and plays the video in media player 112. Also, media player manager 110 may display captions from the caption file in media player 112. For example, a caption is shown at 114 in media player 112. As is known, the captions are synchronized to the video, such as when a character speaks, the caption represents what the character spoke.

When media player 112 plays the video, a first caption may mention a character's name. Then, a second caption may include another character's name. This process continues as multiple entities are included in captions displayed in media player 112. In one embodiment, the entity in the caption may be interactive in that a user could select the entity to have an entity card for that entity displayed. However, media player 112 may only display captions very briefly. For example, media player 112 displays the caption when a character speaks a line in the dialogue, but then once another character starts speaking, the caption is removed as media player 112 displays another caption. Because of the short duration media player 112 displays the caption, a user may not have time to select the entity in the caption. Further, the entity that appears in the caption may not be in the current shot. For example, a character may be mentioned in the caption, but may appear in a previous or future shot in the video. Thus, when the character appears in a future shot, the user may want to know more information about the character at that time. Due to the above reasons, a queue 116 displays a list of entities that may have appeared in previous (or future) captions. The user may select queue 116 to display a list of entities. For example, queue 116 may be hidden until a user hovers a pointer over the area of media player 112 to display the queue 116 or selects an area in media player 112 to display queue 116. In other embodiments, media player 112 may always display queue 116, such as in a sidebar area. The user can then view the entities and select one to have a corresponding entity card displayed.

Figure 2:
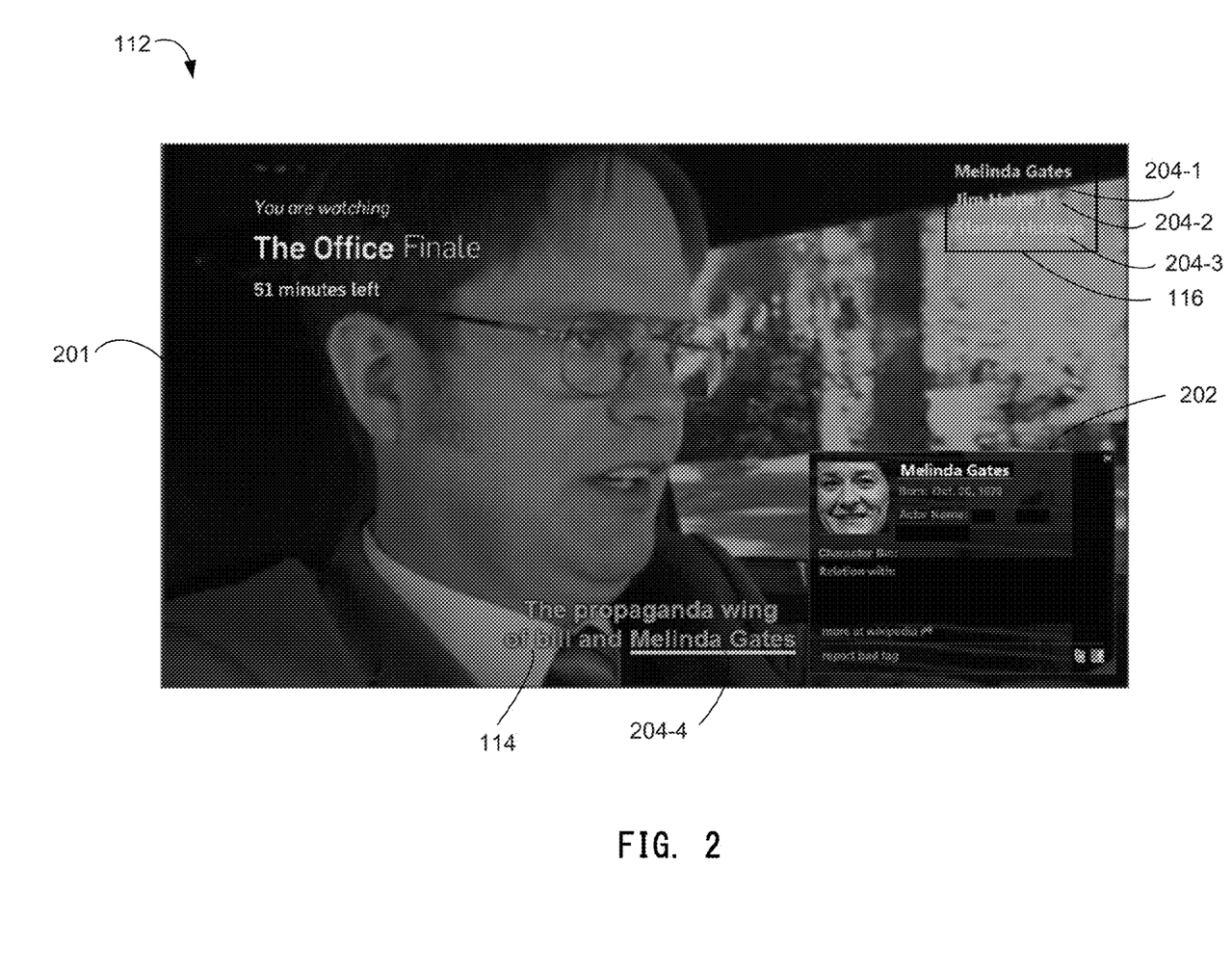
FIG. 2 depicts a more detailed example of a media player according to one embodiment.

FIG. 2 depicts a more detailed example of media player 112 according to one embodiment. Media player 112 displays a video in a section 201. Additionally, media player 112 displays a caption of "The propaganda wing of bill and Melinda Gates" at 114. The entity in the caption is "Melinda Gates" as shown at 204-4. A user may select "Melinda Gates" in the caption to display an entity card 202 for Melinda Gates. The entity card includes additional information about the character.

Also, in queue 116, the entity Melinda Gates is shown at 204-1. This corresponds to the entity in the caption at 204-4. Additionally, queue 116 shows other entities of "Jim Halpert" and "Stanley Hudson" at 204-2 and 204-3, respectively. These entities may have been found in previous captions for the video. For example, queue 116 may hold entities found in captions within a certain time period, such as five minutes before the present time in the video.

In addition to receiving user input selecting the entity in the caption at 204-4, user device 104 may receive a user input from a user selecting one of the entities displayed in queue 116. For example, a user may select the entity "Melinda Gates" in shown at 204-1 in queue 116. Media player 112 then displays entity card 202. Further, if a user selects either entity shown at 204-2 or 204-3 in queue 116, media player 112 may display a different entity card. For example, media player 112 may display an entity card for "Jim Halpert" or "Stanley Hudson" if the entities at 204-2 and 204-3 are selected, respectively.

Figure 3:
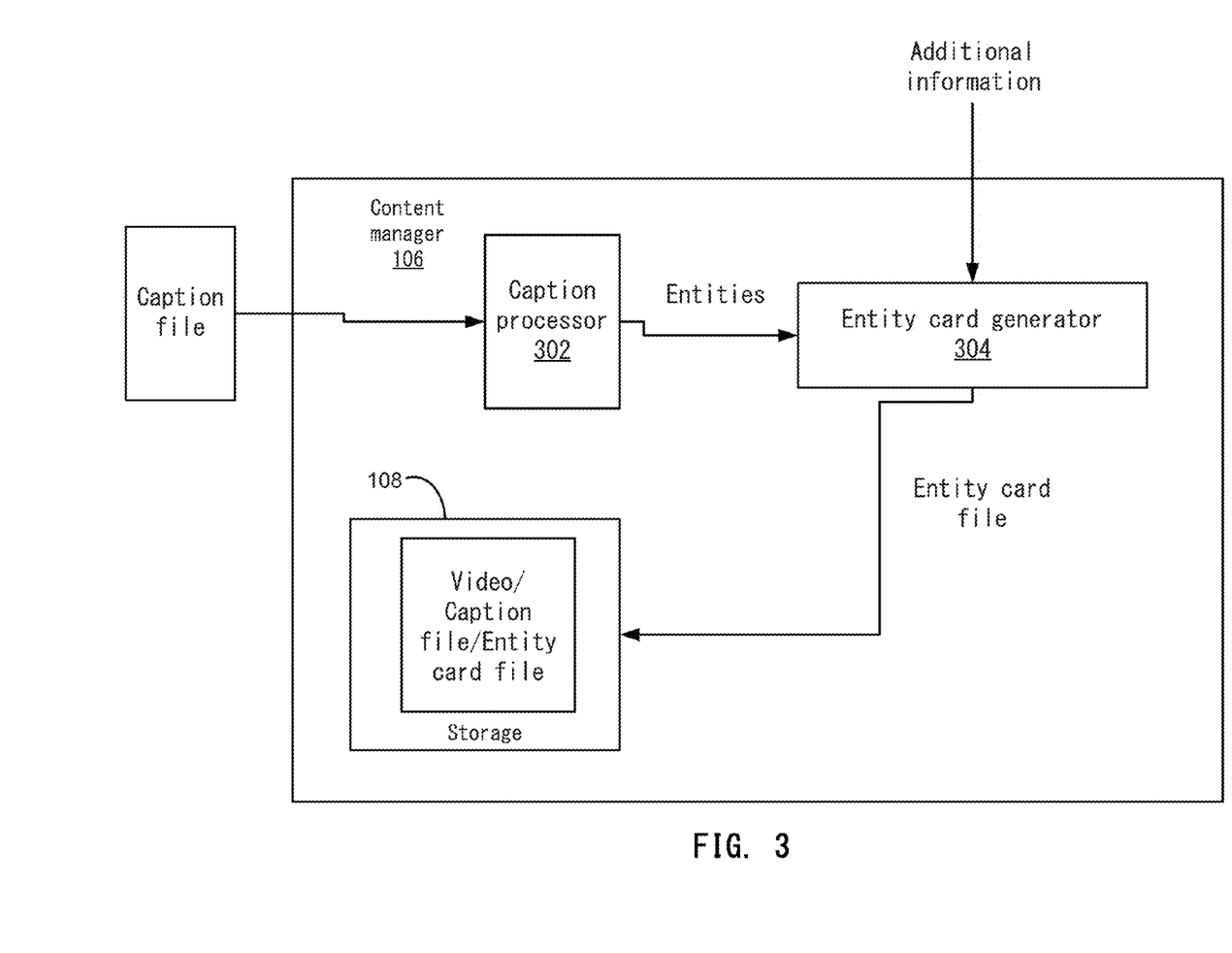
FIG. 3 depicts a more detailed example of a content manager for processing a caption file according to one embodiment.

Before describing how media player 112 displays entity cards in more detail, the entity card generation process will now be described. To generate the entity cards, particular embodiments process the caption file to determine the entities in the captions. FIG. 3 depicts a more detailed example of content manager 106 for processing a caption file according to one embodiment. A caption processor 302 receives the caption file and uses a caption processing algorithm to recognize entities in the captions. For example, a natural language processing (NLP) algorithm may determine entities by comparing words in the captions to recognizable entities. Different NLP techniques that may be used to recognize entities are known in the art.

Additionally, caption processor 302 may determine relationships between entities in the captions. For example, caption processor 302 may determine that two entities in the captions may be friends in the video. In another example, caption processor 302 may determine that two entities are father-son. To determine the relationship, caption processor 302 may use the semantics of the captions to extract context. In contrast to face detection, which detects the faces of the characters in the video, the captions may give more semantic information thus allowing caption processor 302 to determine the relationship between entities. For example, the spoken dialogue provides more hints on a relationship than faces in the video as the words of the speech can be analyzed.

Once determining the entities, an entity card generator 304 generates entity cards for the entities. For example, entity card generator 304 may receive additional information for each entity. The additional information may include information regarding the character in the video and/or a real-life person associated with the character. Also, additional information for inanimate objects, such as brand names, may also be determined The additional information may be from external sources, such as websites and information services. Also, internal information, such as information from the media player service or video, may be used.

Figure 4:
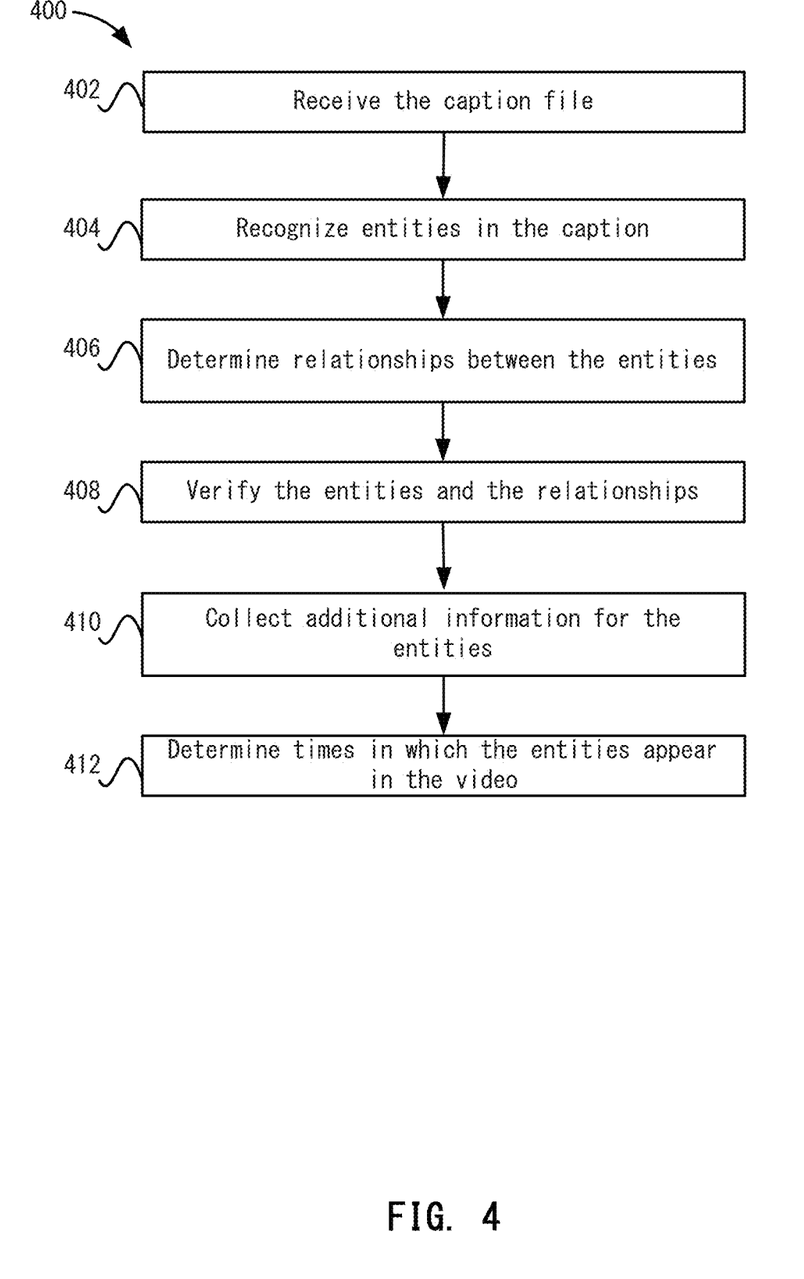
FIG. 4 depicts a simplified flowchart of a method for generating entity cards according to one embodiment.

FIG. 4 depicts a simplified flowchart 400 of a method for generating entity cards according to one embodiment. At 402, content manager 106 receives the caption file. The caption file may be received from a company associated with the video. For example, the company may release a caption file with the video that summarizes a spoken dialogue in the video.

At 404, content manager 106 recognizes entities in the caption. As discussed above, content manager 106 may use natural language processing. Further, content manager 106 may also use entity name extension, which determines aliases for entity names to recognize the entity. Also, named entity recognition (NER) may be used to recognize names in the captions. For example, content manager 106 may use a string (alias) match to recognize entities in the captions. Content manager 106 may have a list of names that may appear in the video and may search for these names. Further, content manager 106 may use a library of well-known entities, such as objects that may be offered for sale (e.g., purses, clothes, etc.), to recognize when these entities appear in the captions.

At 406, content manager 106 determines relationships between the entities. Content manager 106 may determine the relationships by analyzing the semantics of the captions. For example, content manager 106 uses the part of speech, co-reference resolution, and sequence pattern mining to determine the relationship. In one embodiment, content manager 106 may input the entities and associated captions into an algorithm that may output the relationships, such as Mike and Tom are friends.

At 408, content manager 106 verifies the entities and the relationships. For example, content manager 106 may recognize some entities or relationships that may not be accurate. Also, in one embodiment, the verification may be manually performed, such as a user may inspect the entities that are recognized and determine whether or not the entities or relationships are appropriate. In this case, content manager 106 receives user input from a user verifying the entities or relationships. The verification step may or may not be performed.

At 410, content manager 106 collects additional information for the entities. Content manager 106 may collect external information from web resources or from the video. For example, content manager 106 may retrieve a description of an entity from a free web resource. Content manager 106 may also retrieve a name of the product from the video using optical character recognition (OCR). For example, OCR reads the name of a purse being used by a character from the video.

At 412, content manager 106 determines times in which the entities appear in the video. For example, the entity may appear at multiple places in the captions. At each point, content manager 106 may associate the appropriate entity card with the entity. In one embodiment, the entity card may be linked to the entity when the entity appears in the caption. In another embodiment, the entity card may be linked to a point where the entity appears in the video even though the entity does not appear in the caption. For example, once the entity is mentioned in the caption, the entity may not appear in the video at that point. However, after a minute, the video may show the entity, such as the character may appear in the video. By using queue 116, the entity would appear in the queue and a user could select the entity in queue 116 to display additional information about the entity even though the entity was previously mentioned in a caption that is currently not shown in the video.

Figure 5A:
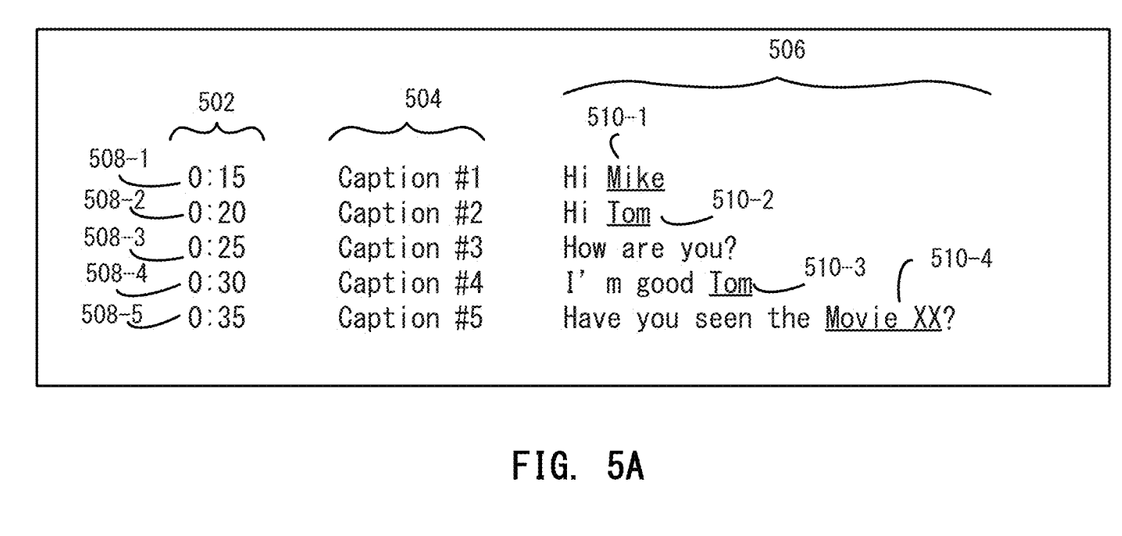
FIG. 5A shows an example of a series of captions according to one embodiment.
Figure 5B:
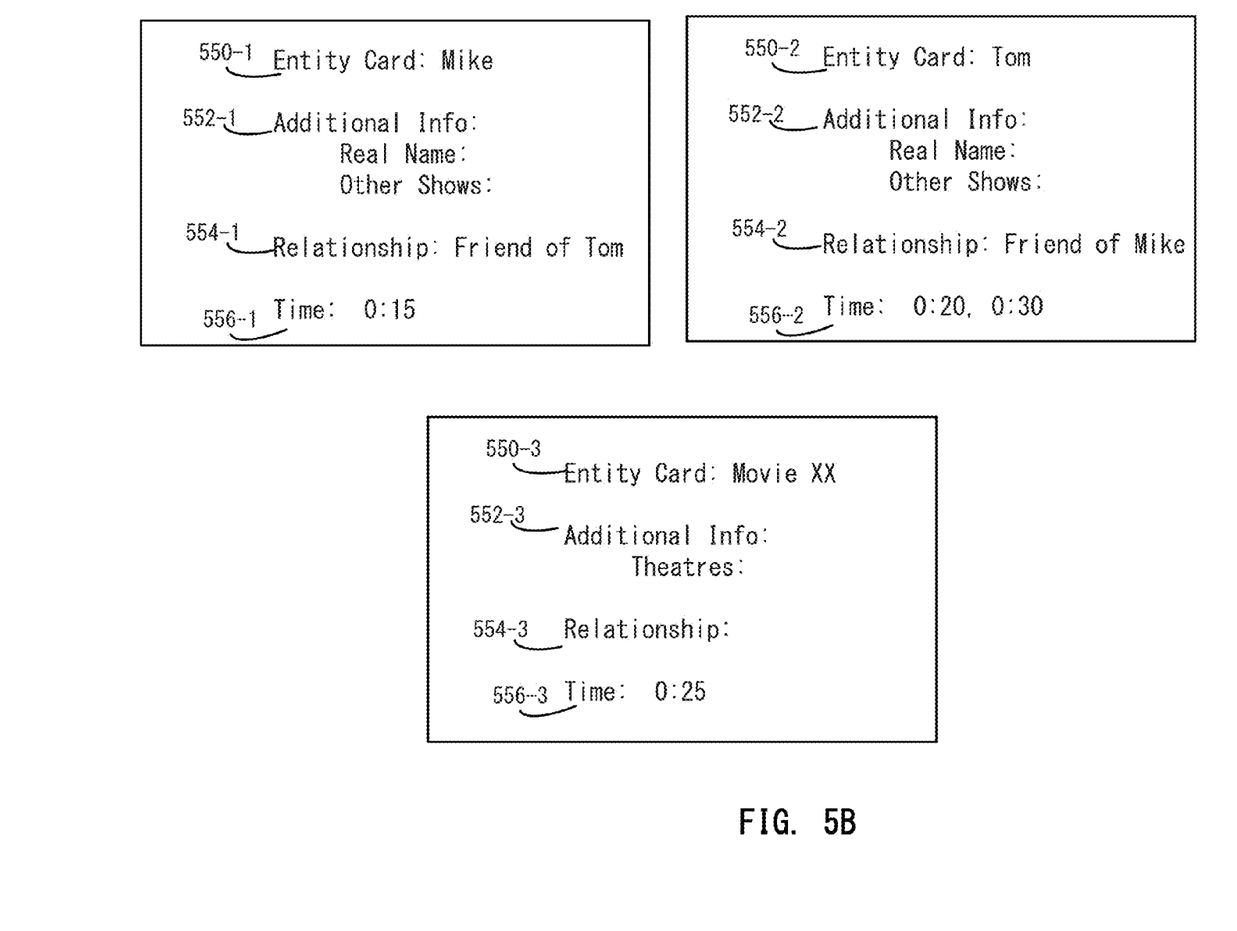
FIG. 5B shows entity cards that the content manager may create from the entities recognized in the captions shown at FIG. 5A in one embodiment.

The following describes a series of captions and entities cards that content manager 106 creates for the entities in the captions. FIG. 5A shows an example of a series of captions and FIG. 5B shows entity cards that include the links to the captions according to one embodiment. In FIG. 5A, a time in the video is shown in a column 502; different captions #1, #2, #3, #4, and #5 are shown in a column 504; and the text for each respective caption is shown at a column 506. At 508-1, at the 0:15 second mark of the video, caption #1 is "Hi Mike". At 510-1, content manager 106 recognizes an entity in the caption as "Mike". At 508-2, at the 0:20 second mark of the video, a caption #2 is "Hi Tom". At 510-2, content manager 106 recognizes an entity in the caption as "Tom". At 508-3, at the 0:25 second mark of the video, a caption #3 is "How are you?" In this caption, content manager 106 does not recognize any entities. At 508-4, at the 0:30 second mark, a caption #4 is "I'm good, Tom". At 510-3, content manager 106 recognizes "Tom" as an entity in the caption. At 508-5, at the time 0:35 seconds of the video, a caption #5 is "Have you seen the movie XX"? At 510-4, content manager 106 recognizes "movie XX" as an entity in the caption. For example, "XX" may be the name of the movie.

FIG. 5B shows entity cards that content manager 106 may create from the entities recognized in the captions shown at FIG. 5A in one embodiment. In one example, content manager 106 creates entity cards for Mike, Tom, and the movie XX. Captions #2 and #4 included two occurrences of the entity Tom. Content manager 106 may analyze various sources of information to determine the relationship between the two occurrences of the entity Tom, such as information regarding the storyline, a list of characters, and the semantics of these captions and other captions around captions #2 and #4. For example, in some cases, the two occurrences of Tom may be for two different characters with the same name. However, in this case, content manager 106 determines that the two occurrences of the entity Tom are associated with the same person due to a conversation occurring between Mike and Tom. Thus, content manager 106 does not create two different entity cards for the entity of Tom.

An entity card 550-1 includes the entity Mike. At 552-1, the entity card includes additional information, such as a real name of the person playing the character and other shows the person is in. Also, at 552-2, the relationship of Mike with other characters is shown. For example, content manager 106 may determine that Mike is a friend of Tom. Content manager 106 may determine the relationship based on the current conversation in captions #1-#4. At 556-1, entity card 550-1 includes the time at which the entity appears in the video. For example, the entity of Mike appears at the 0:15 second mark of the video. The time will be used by media player 112 to determine when to insert entities into queue 116 and also to determine when entity cards are available for display in media player 112.

Entity card 550-2 includes the entity Tom. At 552-2, additional information includes a real name of the person playing the character Tom and other shows the person is in. At 554-2, the relationship indicates that Tom is a friend of Mike. Also, at 556-2, the times at which the entity appears in the captions in the video are at the 0:20 and 0:30 second marks.

Entity card 550-3 describes the movie XX. At 552-3, the additional information describes theatres nearby at which the movie XX is being offered. At 554-3, no relationship information is described due to the movie XX not being related to anything in the video. Finally, at 556-3, the time of 0:35 seconds indicates the time at which the movie XX was mentioned in the captions.

Figure 6:
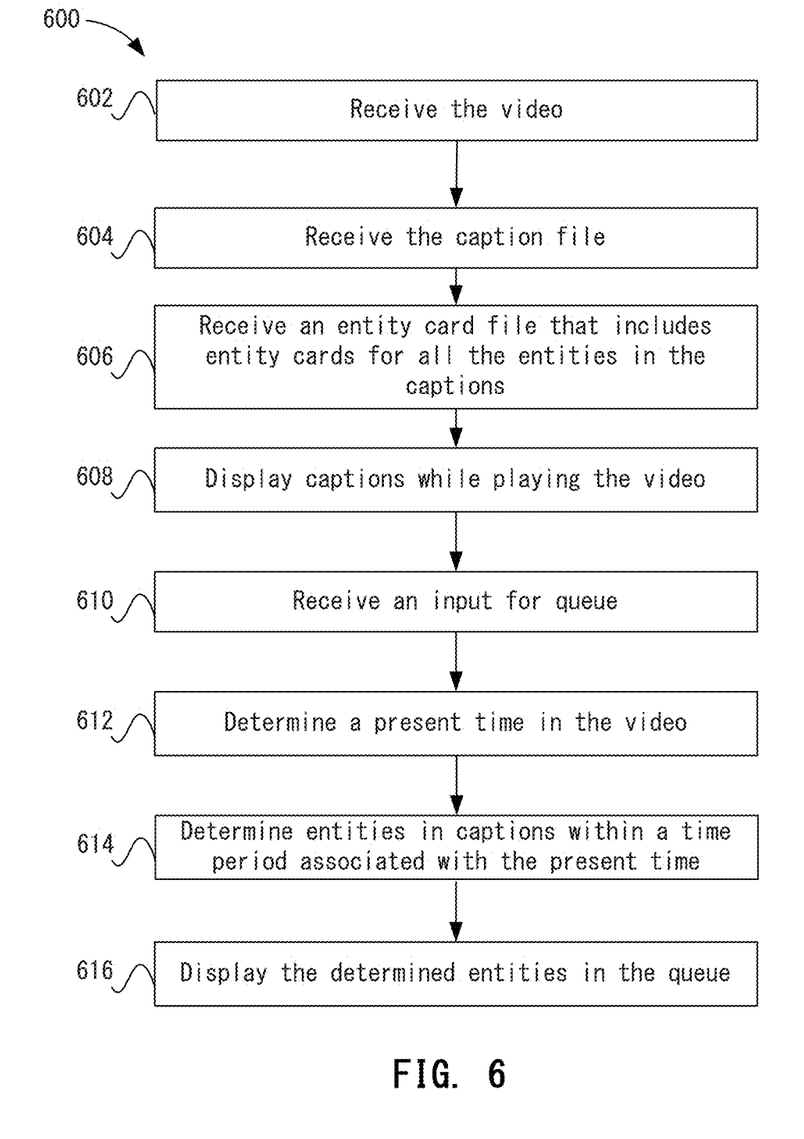
FIG. 6 depicts a simplified flowchart of a method for displaying entities in media player 112 according to one embodiment.

Once processing the captions and generating entity cards, media player 112 can play the video along with the captions. FIG. 6 depicts a simplified flowchart 600 of a method for displaying entities in media player 112 according to one embodiment. At 602, user device 104 receives the video. For example, user device 104 may receive portions of the video that are streamed from content server 102. Also, at 604, user device 104 receives the caption file. In one embodiment, content server 102 may send the entire caption file before the video starts playing. Content server 102 sends the entire caption file because it may be a smaller size and can be sent efficiently through a network. At 606, user device 104 also receives an entity card file that includes entity cards for all the entities in the captions. Content server 106 may also send the entire entity card file along with the caption file.

At 608, media player 112 displays captions while playing the video. Although displaying captions is described, it will be understood that captions may not be displayed to enable the use of queue 116. For example, queue 116 may always be enabled and a user may either select queue 116 to display the entities in queue 116 or media player 112 may always display queue 116. In this case, a user may either hear an entity spoken in the video and select queue 116 to display the entity or, when queue 116 is always displayed, the user may see the entity displayed in queue 116 and decide to select one of the entities to display additional information. By providing queue 116 without having the captions displayed, the processing of the captions to determine the entities may be more efficient than analyzing the video. Thus, even without the captions being displayed, entities in queue 116 are still helpful to a user.

At 610, media player 112 receives an input for queue 116. For example, the input may cause queue 116 to be displayed. In this case, media player manager 110 needs to determine how many entities to display in the queue. For example, media player manager 110 may determine entities that appeared in captions for the last five minutes of the video. In this case, at 612, media player manager 110 determines a present time in the video, such as when the input was received. Then, at 614, media player manager 110 determines entities in captions within a time period associated with the present time. At 616, media player manager 110 then displays the determined entities in queue 116. As described above, queue 116 is configured to display interactive links for the entities. Thus, when a user selects one of the entities, media player 112 can display a corresponding entity card in response.

Figure 7:
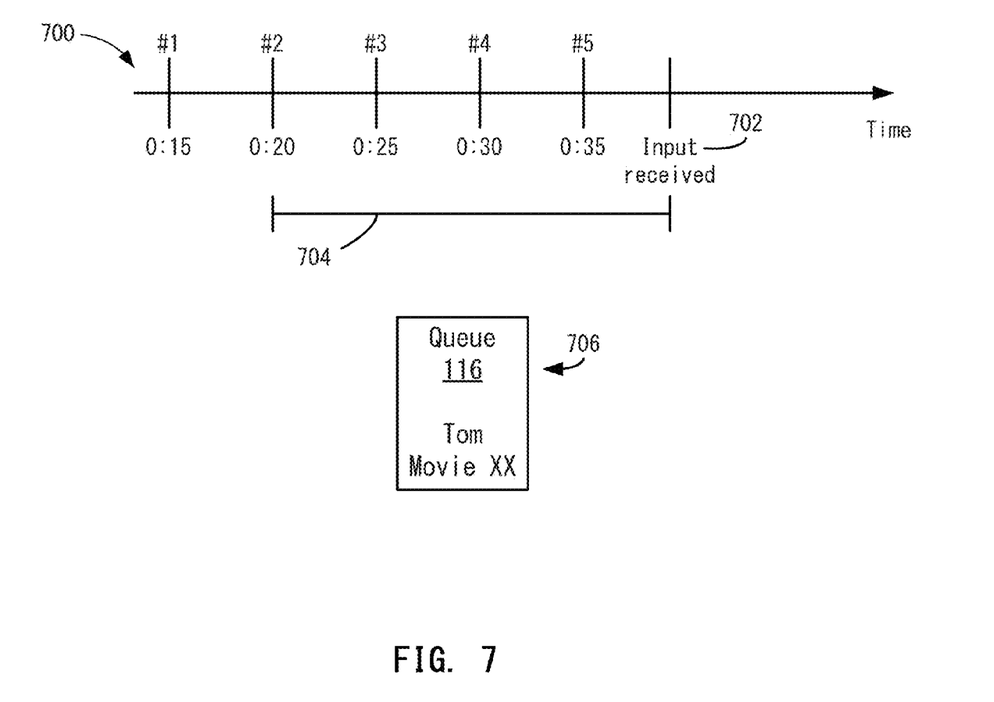
FIG. 7 shows an example of a timeline that illustrates the determination of entities to include in a queue according to one embodiment.

FIG. 7 shows an example of a timeline 700 that illustrates the determination of entities to include in queue 116 according to one embodiment. Timeline 700 shows the captions that are displayed at the times in the video as described in FIG. 5A. At 702, media player 112 receives an input requesting display of queue 116. The input may be received at the 0:40 second mark. For discussion purposes, the time period in which media player manager 110 searches for captions may be 20 seconds and is shown at 704. In this case, the entities found within captions in time period 704 are Tom and movie XX. Thus, as shown at 706, queue 116 includes Tom and movie XX as entities.

In one embodiment, media player manager 110 may continuously determine which entities are included in captions within time period 704. For example, as the video plays, entities that are included in the time period are added to a data structure. As the entities fall outside of the time period, media player manager 110 removes the entities from the data structure. When an input to display queue 116 is received, media player manager 110 displays the entities that are found in the data structure. In another embodiment where queue 116 is always displayed, media player manager 110 displays entities as entities that newly appear in time period 704, and removes entities that drop out of time period 704.

Accordingly, particular embodiments process a caption file of captions instead of the video. This provides a robust determination of entities that may be mentioned in the video without expensive computational requirements of processing video. Further, the captions provide additional semantic meaning in which relationships can be determined between entities. Further, unlike face detection, the dialogue of the video may be a trigger to provide additional information rather than the faces of any characters in the video or objects. This may allow for additional information to be displayed for entities that actually are not shown in the video, but just mentioned in the dialogue.

System Overview

Figure 8:
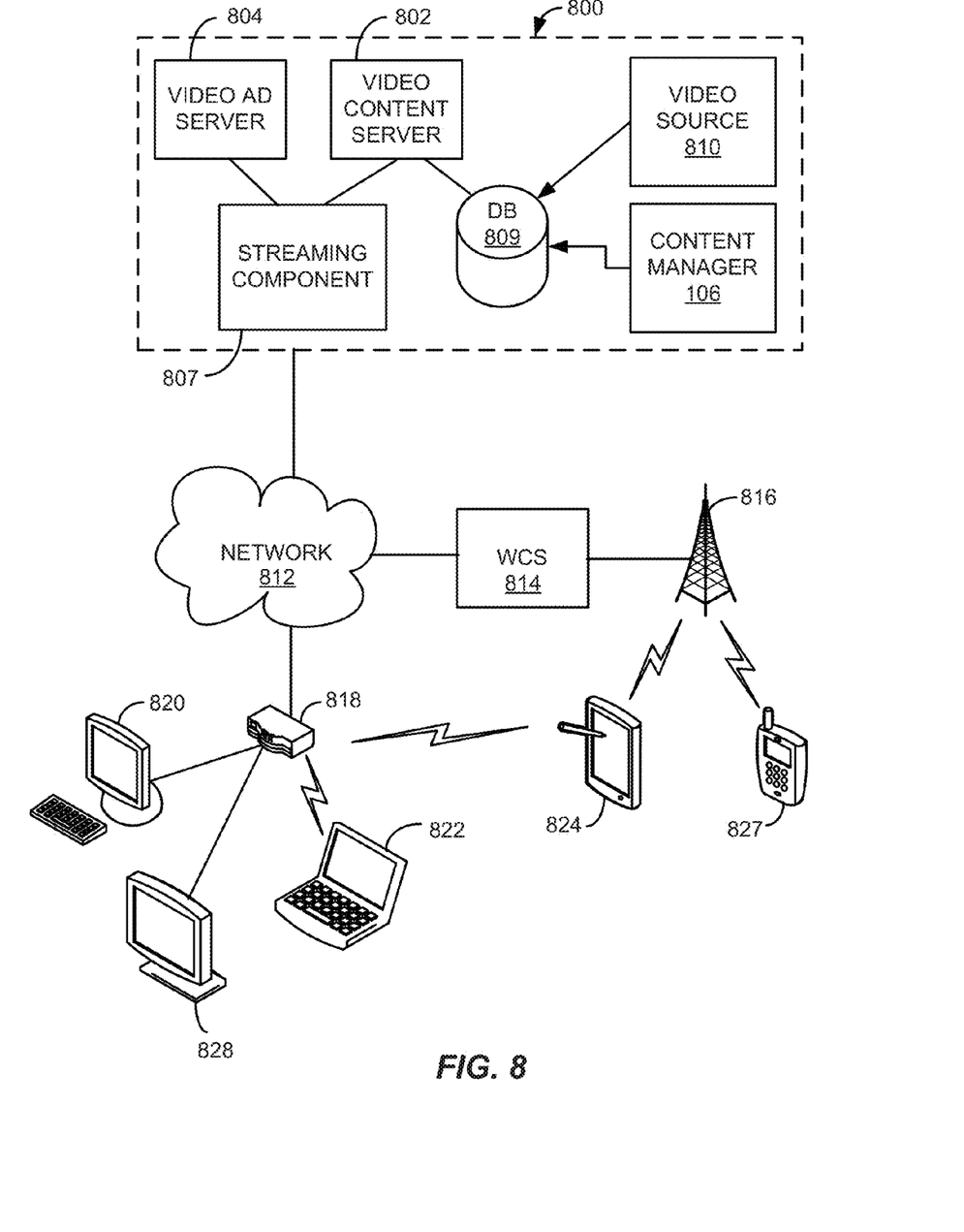
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution of content prepared according to the present disclosure. It should be appreciated that the present technology is not limited to streaming video applications, and may be adapted for other applications.

Video data may be obtained from one or more sources for example, from a video source 810, for use as input to a video content server 802. The input video data may comprise raw or edited frame-based video data in any suitable digital format, for example, MPEG-1, MPEG-2, MPEG-4, VC-1, or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include content manager 106. Content manager 106 may store the entity card file in database 809. Video content server 802 may then retrieve the entity card file and send the file to various user devices.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices may be in communication with the video streaming system 800, via the data communication network 812 and/or other network 814. Such client devices may include, for example, one or more laptop computers 822, desktop computers 820, "smart" mobile phones 827, notepad devices 824, network-enabled televisions 828, or combinations thereof, via a router 818 for a LAN, via a base station 816 for a wireless telephony network 814, or via some other connection. In operation, such client devices 820, 822, 824, 827, or 828 may send and receive data or instructions to the system 800, in response to user input received from user input devices or other input. In response, the system 800 may serve video segments and metadata from the data store 809 responsive to selection of interactive links to the client devices 820, 822, 824, 827, or 828 and customize the additional content based on parameters of the client devices, for example respective geographic locations of the client devices, or demographic information concerning respective users of the client devices. The devices 820, 822, 824, 827, or 828 may output interactive video content from the streaming video segment using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Unlike the web server, the streaming component 807 may communicate with the client device using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming component 807 can also deliver live webcasts and can multicast, which allows more than one client to tune into a single stream, thus saving bandwidth. Streaming media players may not rely on buffering to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Output from a media player on the client device may occupy only a portion of total screen area available on a client device, particularly when bandwidth limitations restrict the resolution of streaming video. Although media players often include a "full screen" viewing option, many users prefer to watch video in a display area smaller than full screen, depending on the available video resolution. Accordingly, the video may appear in a relatively small area or window of an available display area, leaving unused areas. A video provider may occupy the unused area with other content or interface objects, including additional advertising, such as, for example, banner ads. Banner ads or similar additional content may be provided with links to an additional web site or page, so that when a user "clicks on" or otherwise selects the banner ad, the additional web site or page opens in a new window.

Figure 9:
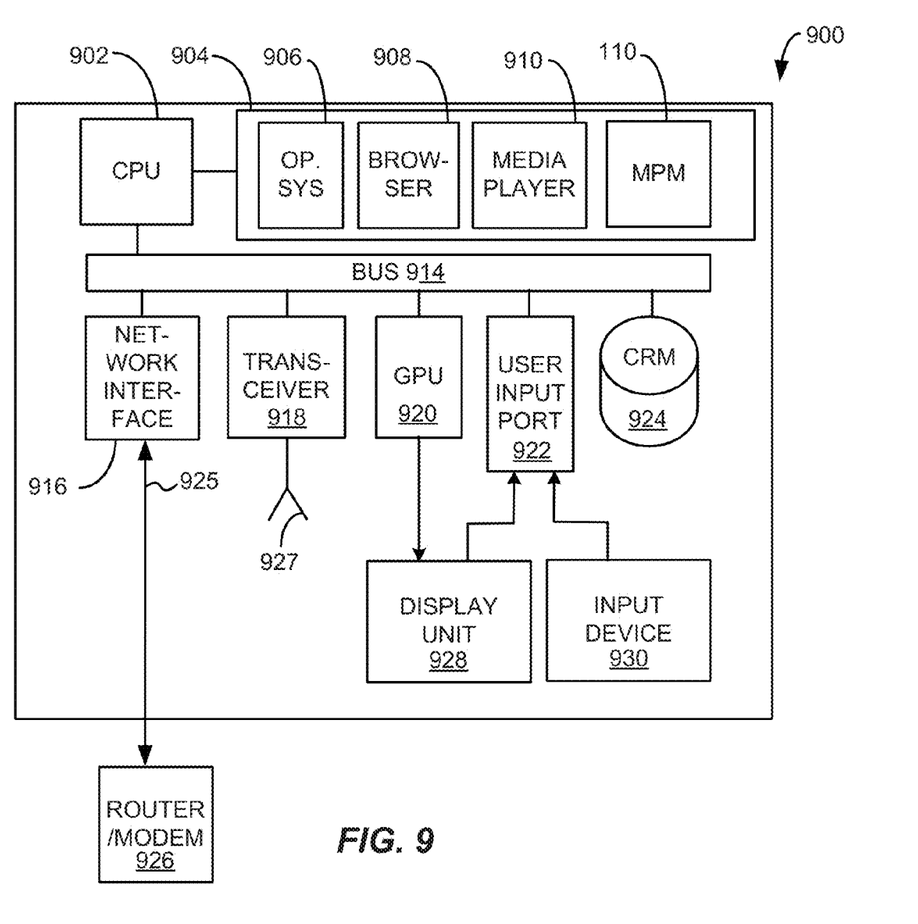
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include media player manager (MPM) 110. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection 925. In the alternative, or in addition, the apparatus 900 may include a transceiver 918 connected to an antenna 927, through which the apparatus 900 may communicate wirelessly with a base station for a wireless communication system or with the router/modem 926. In the alternative, the apparatus 900 may communicate with video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit (GPU) 920) to a display unit 928. Display unit 928 may include any suitable configuration for displaying information to an operator of the apparatus 900. For example, display unit 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display unit 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
  receiving, by a computing device, a video for a media program;
  receiving, by the computing device, a set of captions for a dialog in the video;
  playing, by the computing device, the video in a media player;
  determining, by the computing device, a time associated with playing of the video;
  determining, by the computing device, a set of entities within a time period in relation to the time, the set of entities including a first entity that is included in one or more captions in the set of captions within the time period and a second entity that is displayed in the video within the time period; and
  displaying, by the computing device, links for the set of entities in a queue, wherein the links for set of entities are associated with additional information for each respective entity in the set of entities,
  wherein when a first portion of the video is being currently played that corresponds to a first caption, the second entity in the set of entities is included in a second caption that is associated with a second portion of the video not being currently played and the second entity is included in the set of entities based on an appearance of the second entity in the video being currently played.

2. The method of claim 1, further comprising:
  receiving entities found in the set of captions and additional information for each of the entities;
  determining the set of entities from the received entities; and
  determining the associated additional information from the received additional information.

3. The method of claim 2, wherein the received entities and additional information are received in an entity file.

4. The method of claim 1, wherein determining the set of entities comprises determining which entities are associated with the one or more captions within the time period based on the time.

5. The method of claim 4, wherein the time period is an amount of time before or after the time.

6. The method of claim 1, further comprising:
  receiving a selection of one of the displayed set of entities; and
  displaying the additional information associated with the one of the displayed set of entities.

7. The method of claim 1, further comprising:
  displaying captions in the set of captions along with the video;
  receiving an input for an entity in one of the displayed captions; and
  displaying additional information for the entity selected in one of the displayed captions.

8. The method of claim 1, further comprising receiving an input that causes the queue to be displayed, wherein the time is associated with a current time of playing of the video when the input is received.

9. The method of claim 1, wherein the second entity in the set of entities is not included in one or more captions within the time period.

10. A method comprising:
  receiving, by a computing device, captions for a video of a media program;
  analyzing, by the computing device, the captions to determine entities in the captions;
  determining, by the computing device, additional information for respective entities in the captions;
  associating, by the computing device, respective additional information with occurrences of the respective entities in the captions;
  associating, by the computing device, respective additional information with determined appearances of the respective entities in the video; and
  storing, by the computing device, the additional information and the entities, wherein:
  the entities are useable to display links to a set of entities in a queue in coordination with a time period associated with a time when the video is being played by a user device, the set of entities including a first entity that is included in one or more captions within the time period and a second entity that is displayed in the video within the time period, and
  the entities are configured such that when a first portion of the video is being currently played that corresponds to a first caption, the second entity in the set of entities is included in a second caption that is associated with a second portion of the video not being currently played and the second entity is included in the set of entities based on an appearance of the second entity in the video being currently played.

11. The method of claim 10, wherein analyzing comprises using a text recognition algorithm to determine the entities in the captions.

12. The method of claim 10, wherein analyzing comprises determining relationships between two entities based on text of the captions.

13. The method of claim 10, further comprising:
  generating entity cards for respective entities; and
  associating a set of times in which an entity appears in the captions for each respective entity card.

14. The method of claim 13, further comprising adding the additional information for a respective entity to the entity card.

15. The method of claim 10, further comprising:
  sending the additional information and the entities to the user device, wherein the user device displays links for the set of entities in the queue in the coordination with the time when the video is being played by the user device.

16. A non-transitory computer-readable storage medium containing instructions, that when executed, control a computer system to be configured for:
receiving a video for a media program;
receiving a set of captions for a dialog in the video;
playing the video in a media player;
determining a time associated with playing of the video;
determining a set of entities within a time period in relation to the time, the set of entities including a first entity that is included in one or more captions in the set of captions within the time period and a second entity that is displayed in the video within the time period; and
displaying links for the set of entities in a queue, wherein the links for set of entities are associated with additional information for each respective entity in the set of entities,
wherein when a first portion of the video is being currently played that corresponds to a first caption, the second entity in the set of entities is included in a second caption that is associated with a second portion of the video not being currently played and the second entity is included in the set of entities based on an appearance of the second entity in the video being currently played.

17. The non-transitory computer-readable storage medium of claim 16, further configured for:
receiving entities found in the set of captions and additional information for each of the entities;
determining the set of entities from the received entities; and
determining the associated additional information from the received additional information.

18. The non-transitory computer-readable storage medium of claim 16, wherein determining the set of entities comprises determining which entities are associated with the one or more captions within the time period based on the time.

19. The non-transitory computer-readable storage medium of claim 16, further configured for:
displaying captions in the set of captions along with the video;
receiving an input for an entity in one of the displayed captions; and
displaying additional information for the entity selected in one of the displayed captions.

20. An apparatus comprising:
one or more computer processors; and
a non-transitory computer-readable storage medium comprising instructions, that when executed, control the one or more computer processors to be configured for:
receiving captions for a video of a media program;
analyzing the captions to determine entities in the captions;
determining additional information for respective entities in the captions;
associating respective additional information with occurrences of the respective entities in the captions;
associating, by the computing device, respective additional information with determined appearances of the respective entities in the video; and
storing the additional information and the entities, wherein:
the entities are useable to display links to a set of entities in a queue in coordination with a time period associated with a time when the video is being played by a user device, the set of entities including a first entity that is included in one or more captions within the time period and a second entity that is displayed in the video within the time period, and
the entities are configured such that when a first portion of the video is being currently played that corresponds to a first caption, the second entity in the set of entities is included in a second caption that is associated with a second portion of the video not being currently played and the second entity is included in the set of entities based on an appearance of the second entity in the video being currently played.

21. The apparatus of claim 20, further configured for:
generating entity cards for respective entities; and
associating a set of times in which an entity appears in the captions for each respective entity card.

* * * * *

UNITED STATES PATENT AND TRADEMARK OFFICE
CERTIFICATE OF CORRECTION

PATENT NO. : 9,716,919 B2  
APPLICATION NO. : 14/080666  
DATED : July 25, 2017  
INVENTOR(S) : Tao Xiong et al.

Page 1 of 1

It is certified that error appears in the above-identified patent and that said Letters Patent is hereby corrected as shown below:

In the Claims

In Column 14, Claim 9, Line 20, please insert --the-- after the word in.

Signed and Sealed this
Third Day of October, 2017

Joseph Matal
*Performing the Functions and Duties of the*
*Under Secretary of Commerce for Intellectual Property and*
*Director of the United States Patent and Trademark Office*